J. A. VAUGHN.
Grain Separator.
No. 1,195. Reissued June 11, 1861.
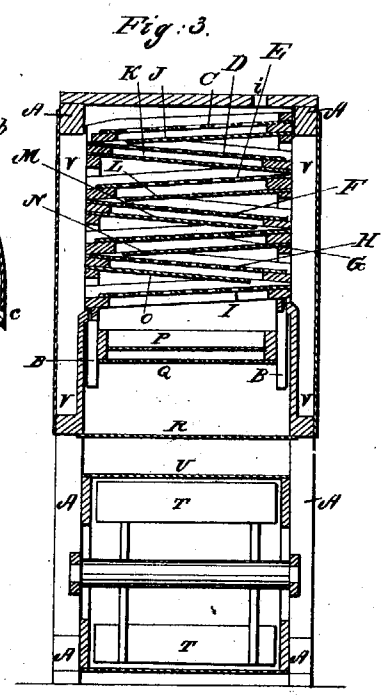
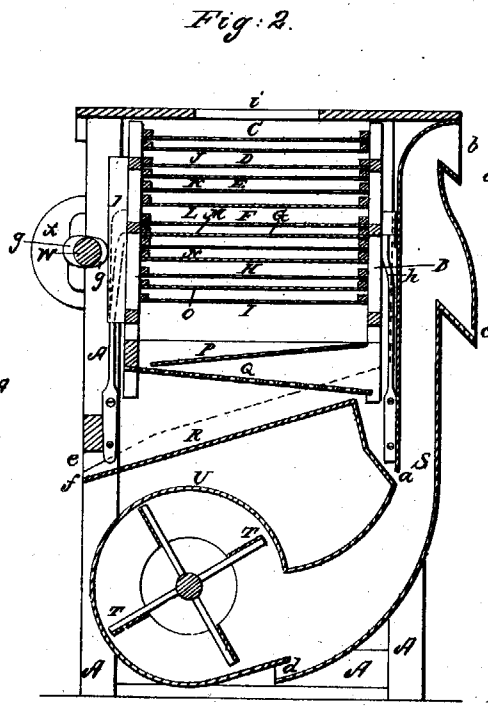
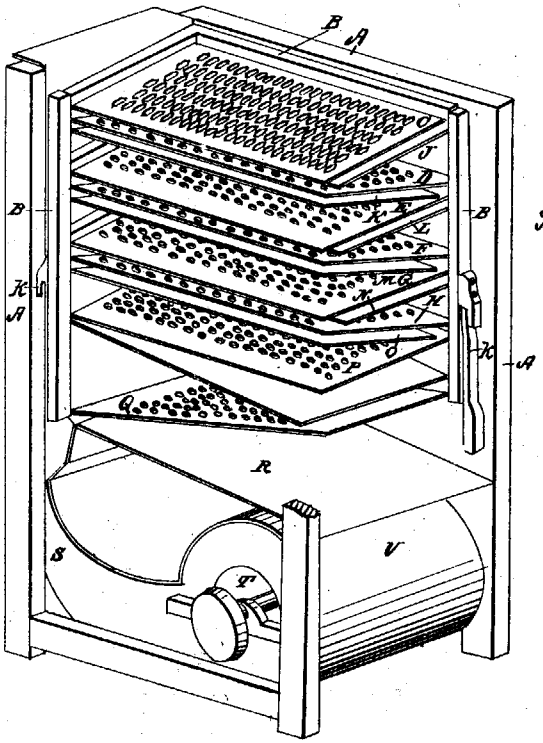
Witnesses:
S. Cohen
Julius Hirsch
Inventor:
James A Vaughn
N. PETERS, Photo-Lithographer, Washington, D. C.

UNITED STATES PATENT OFFICE.

JAMES A. VAUGHN, OF CUYAHOGA FALLS, OHIO.

IMPROVEMENT IN GRAIN-SEPARATORS.

Specification forming part of Letters Patent No. 28,026, dated April 24, 1860; Reissue No. 1,120, dated January 8, 1861; Reissue No. 1,195, dated June 11, 1861.

*To all whom it may concern:*

Be it known that I, JAMES A. VAUGHN, of Cuyahoga Falls, in the county of Summit and State of Ohio, have invented certain new and useful Improvements in Grain-Separators; and I do hereby declare the following to be a full, clear, and exact description of the construction and operation of the same, reference being had to the accompanying drawings, making a part of this specification, in which—

Figure 1 represents a perspective view of the machine, with a portion broken away to show the interior. Fig. 2 represents a longitudinal vertical section taken through the machine, and Fig. 3 represents a vertical transverse section through the same.

Similar letters of reference, where they occur in the three several drawings, refer to like parts of the machine in all the figures.

In the separation of grain from the impurities that are ordinarily gathered with it, and also in the separation of oats from wheat, a series of long zigzag screens and a long fan have been used. This arrangement, however, is very objectionable: First, because the long screens are difficult of access, are liable to become clogged, and must be often cleaned to make them efficient, and cannot readily be got at; and, second, a long fan cannot be made to produce a uniform blast throughout the wind-trunk, because the air must be drawn into the fan-case at the ends only, and none at the center, the consequence of which is that there is a sharp blast at the ends or sides, and comparatively no blast in the center portion of the wind-trunk. These two imperfections in the long screens and long fan make a grain-separator constructed after such a plan of comparatively little or no practical value, and my object and aim has been to overcome these objectionable features, and which I have effectually done as and in a manner which I will hereinafter explain.

The nature of my invention consists in combining a series of short zigzag screens and directing-boards that have a shake motion communicated to them with a short fan, so that the screens may be readily got at to clean them, and the short fan make a uniform blast throughout the width of the wind-trunk; or the nature of my invention may be stated in this form: a series of zigzag screens and directing-boards that have a shake motion communicated to them, with the riddles arranged endwise to the fan-trunk, which arrangement avoids all the defects above mentioned that attach to the long screens and long fan.

To enable others skilled in the art to make and use my invention, I will proceed to describe the same with reference to the drawings.

A represents the main frame of the separator, in which I hang a second frame, B, that contains the series of zigzag riddles C D E F G H I, and underneath the riddles, respectively, the series of inclined directing-boards J K L M N O. These riddles and directing-boards incline across the machine or the narrow way of the frame, and their ends are towards the fan-trunk, which admits of their being easily cleaned from one end of the machine, and without being incommoded by the blast trunk, as is the case when arranged lengthwise of the machine. The frame B, with its riddles, receives a shake motion by means of the eccentric *g* on the shaft W, or by any other known means of accomplishing this object. The fan-case U is arranged across the frame, so as to contain a short fan, T. The short fan-case and fan admit of a more uniform current of air throughout the wind-trunk S than a long fan-case, fan, and wind-trunk can possibly admit of, for reasons above stated.

In the operation of this machine the grain that is to be cleaned and separated from other grains and impurities is fed in from a hopper over the opening *i*, and falls upon the first screen. The oats, sticks, &c., pass over the screen into the chamber V, while the wheat, with some smaller seeds, goes through the openings of the screen and onto the first directing-board, J, which in turn delivers them to the next screen, where a similar operation goes on, and thence to another, and so on throughout the series, the oats falling over at the sides and the grain passing through the riddles until they arrive at the screen Q, where the cockle, &c., pass through said screen, and the wheat is dropped into the blast in the wind-trunk S at *a*, which takes out the lighter grains, dust, &c., the heavy wheat coming out at *d*, the lighter wheat at *c*, and the dust, &c., at *b*. The oats are delivered at *e*, and the cockle at *f*, and thus each separated thing is delivered at a separate place. The leading characteristic of this invention, however, is the short riddles and the short fan, the riddles being arranged endwise toward the fan by short riddles. I mean short in the direction in which the grain passes over them.

Having thus fully described my invention, what I claim herein as new is—

The combination of the series of zigzag riddles and directing-boards, having a shake motion imparted to them, with a short fan, when arranged to operate therewith, substantially as herein described.

JAMES A. VAUGHN.

Witnesses:
P. G. SOMERS,
CHAS. HUNT.